United States Patent
Duan (10) Patent No.: US 12,104,744 B2
(45) Date of Patent: Oct. 1, 2024

(54) TURNER APPARATUS

(71) Applicant: Jinyan Duan, Shenzhen (CN)

(72) Inventor: Jinyan Duan, Shenzhen (CN)

(*) Notice: Subject to any disclaimer, the term of this patent is extended or adjusted under 35 U.S.C. 154(b) by 140 days.

(21) Appl. No.: 17/829,359

(22) Filed: Jun. 1, 2022

(65) Prior Publication Data

US 2023/0392745 A1 Dec. 7, 2023

(51) Int. Cl.
*G03B 17/56* (2021.01)
*F16M 11/20* (2006.01)
*F16M 13/02* (2006.01)

(52) U.S. Cl.
CPC ........ *F16M 11/2014* (2013.01); *F16M 13/02* (2013.01); *G03B 17/561* (2013.01)

(58) Field of Classification Search
CPC .. F16M 11/2014; F16M 11/041; F16M 11/10; F16M 13/02; F16M 2200/028; G03B 17/561; H04N 5/2252
USPC .......................................... 248/349.1, 346.01
See application file for complete search history.

(56) References Cited

U.S. PATENT DOCUMENTS

| | | | | |
|---|---|---|---|---|
| 2,347,483 A * | 4/1944 | Katcher | .................. | F16C 19/10 384/615 |
| 4,659,050 A * | 4/1987 | Tabayashi | ............. | F16C 33/588 248/349.1 |
| 4,822,183 A * | 4/1989 | Lederman | ................ | F16C 19/10 384/477 |
| 5,243,434 A * | 9/1993 | Nodama | ................. | F16M 11/18 348/827 |
| 5,479,867 A * | 1/1996 | Blevins | .................. | A47B 49/00 108/22 |
| 5,779,309 A * | 7/1998 | Lu | ............................ | A47C 3/18 297/344.26 |
| 5,881,950 A * | 3/1999 | Koehn | ..................... | B65D 5/22 211/163 |
| 6,161,806 A * | 12/2000 | Crosson | ................. | A47B 11/00 248/371 |
| 6,447,065 B1 * | 9/2002 | Ropp | ....................... | A47C 3/18 297/344.21 |
| 6,801,426 B2 * | 10/2004 | Ichimura | ............ | F16M 11/2014 248/371 |
| 6,896,330 B1 * | 5/2005 | Yu | .......................... | A47C 15/00 297/344.21 |
| 6,997,512 B1 * | 2/2006 | Yu | ........................... | A47C 3/18 297/344.21 |

(Continued)

*Primary Examiner* — Nkeisha Smith (57) ABSTRACT

A turner apparatus, adapted for supportively disposed between two surfaces of two objects so as to allow the two objects rotating with respect to each other, includes a frame body and a rotor mechanism. The frame body includes a ring-shape turner frame and a ring-shape support turner, wherein the turner frame having a ring-shape rotor chamber formed therein and said support turner is rotatably mounted at an opening of the rotor chamber to enclose the rotor chamber. The rotor mechanism which is rotatably received in said rotor chamber includes a plurality of rotors and a ring-shape retainer unit configured to intervally retain the plurality rotors in a rotatable manner. The turner frame has a first rolling surface and the support turner has a second rolling surface, wherein the first and second rolling surfaces are positioned face to face to define a rolling track channel such that each of the plurality of rotors is capable of revolving along the rolling track channel.

16 Claims, 9 Drawing Sheets

(56) References Cited

U.S. PATENT DOCUMENTS

| | | | |
|---|---|---|---|
| 7,090,178 B2 * | 8/2006 | Hughes | F16J 15/43 |
| | | | 277/411 |
| 7,191,458 B2 | 3/2007 | Tokumitsu et al. | |
| 7,708,239 B2 * | 5/2010 | Watanabe | F16M 11/08 |
| | | | 248/125.7 |
| 7,798,067 B2 | 9/2010 | Starnes et al. | |
| 8,186,893 B1 * | 5/2012 | Patterson | F16M 11/10 |
| | | | 396/428 |
| 8,315,143 B2 | 11/2012 | Frederick et al. | |
| 8,864,592 B2 | 10/2014 | Baxter et al. | |
| 9,377,157 B1 * | 6/2016 | Kilgore | F16M 11/2014 |
| 9,449,640 B2 | 9/2016 | Kreisel et al. | |
| 9,579,995 B2 * | 2/2017 | Haller | B60N 2/16 |
| 9,604,580 B2 * | 3/2017 | Boer | B64D 43/00 |
| 9,671,058 B2 * | 6/2017 | Wang | F16M 11/24 |
| 9,690,173 B1 * | 6/2017 | Jung | F16M 13/02 |
| 10,688,889 B2 * | 6/2020 | Feng | B60N 2/42736 |
| 10,765,241 B2 * | 9/2020 | Royer | A47G 19/08 |
| 10,961,742 B2 | 3/2021 | Carter et al. | |
| 11,506,330 B2 * | 11/2022 | Correa | F16M 11/22 |
| 11,701,986 B2 * | 7/2023 | Feng | B60N 2/02246 |
| | | | 297/344.2 |
| 2009/0045311 A1 * | 2/2009 | Seyedin | F16M 11/08 |
| | | | 248/349.1 |
| 2014/0224952 A1 * | 8/2014 | Mosley | A47G 23/08 |
| | | | 248/349.1 |
| 2016/0047419 A1 * | 2/2016 | Weiss, II | F16C 19/163 |
| | | | 384/480 |
| 2017/0067595 A1 * | 3/2017 | Yun | B60R 11/0241 |
| 2017/0097116 A1 * | 4/2017 | Choquette | F16M 11/08 |
| 2020/0101871 A1 * | 4/2020 | Garotte | B60N 2/43 |

* cited by examiner

TURNER APPARATUS

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to rotation mechanism of turntable, and more particular to a turner apparatus with minimum thickness and durable structure adapted for being supportively disposed between two surfaces of two objects so as to allow the two objects rotating with respect to each other.

Description of Related Arts

Turntable is a common component to be constructed in many devices and apparatuses, such as display device, media disc player, optical device, furniture, game playing platform, deliver apparatus in production line, and etc. Central rotation mechanism is equipped in turntable for displaying purpose as illustrated in U.S. Pat. Nos. 9,449,640 and 7,708,239. Various central rotation mechanisms are equipped in record turntable as disclosed in U.S. Pat. No. 8,315,143 and optical disk as disclosed in U.S. Pat. No. 7,191,458. European Patent No. 1,659,021 discloses a lockable turntable equipped in furniture embodying in auto chairs to enable rotation relative to the underframe around a vertical axis, wherein a circular turning pattern of a release lever is converted to a radial motion pattern of the locking pawls by curved grooves of a cam disc. U.S. Pat. No. 7,7798,067 teaches a thin turntable for a heavy object as a car including ground-engaging load surface facing each other while the load-supporting platform being supported off the ground-engaging member by an intermediate load transfer unit. U.S. Pat. No. 8,864,592 discloses a turntable racing system equipping planetary rotors in drive mechanism operable to rotate the first turntable about a rotation axis extending vertically through the first turntable However, as mentioned above, most of the rotation mechanisms are specifically made for specific device and apparatus with various structures. There is a demand in the market to have a turner apparatus with standard mechanism, relatively low cost and durable structure that is applicable in various configurations for allowing relative rotation between two parallel surfaces of two objects.

SUMMARY OF THE PRESENT INVENTION

The invention is advantageous in that it provides a turner apparatus with as less component as possible while providing relative strong and durable structure which can be equipped in various industrial products to allow relative rotation between two surfaces of two objects.

Another advantage of the invention is to a turner apparatus configured to be supportively mounted between two surfaces of two objects so as to allow the two objects rotating with respect to each other.

Another advantage of the invention is to a turner apparatus which has a relatively thin thickness for ease of mounting between two parallel surfaces ensuring one of the surfaces to turn about the other surface along an axis of the turner apparatus.

Another advantage of the invention is to a turner apparatus, having a ring shape, which is adapted to be directly mounted on a first surface of a first object through a mounting device thereof, wherein a second surface of a second object can rest on the turner apparatus and rotate respect to the first surface of the first object.

Another advantage of the invention is to a turner apparatus, having a ring shape, which is adapted to be embedded in a ring-shaped recess indented in a first surface of a first object and comprises a mounting device configured to easily mount the turner apparatus on the first surface of the first object in such a manner that a second surface of a second object can sit on the first surface of the first object while minimizing a gap between the first and second surfaces and allowing the second object to be rotating on the first surface of the first object or the first object to be rotating on the second surface of the second object.

Another advantage of the invention is to a turner apparatus, having a ring shape, which is adapted to be fixedly mounted on a first surface of a first object through a mounting device thereof such that a second surface of a second object which has ring-shaped receiving recess shaped and sized to fittingly receive the turner apparatus therein such that the first surface of the first object and the second surface of the second object are able to be rotated with respect to each other that not only minimizes a gap between the first and second surfaces but also relatively lock and secure the turner apparatus in position in radial direction with the second object.

Another advantage of the invention is to a turner apparatus which has a simple structure as less as only three components in one embodiment.

Another advantage of the invention is to a turner apparatus which can be produced cost effectively with minimum steps such as by molding in one embodiment.

Another advantage of the invention is to a turner apparatus which provides a correlated configuration that each element is well equipped the other elements using the principle of mechanic in a mutually supporting manner.

According to the present invention, the foregoing and other objects and advantages are attained by a turner apparatus, comprising:

a frame body which comprises:
  a turner frame having a ring-shape rotor chamber integrally formed therein, a ring opening and a ring-shape first rolling surface having a C-shaped cross section; and
  a ring-shape support turner configured to be fittingly and rotatably mounted at the ring opening of the turner frame to form the frame body while the turner frame is able to coaxially rotate with respect to the support turner, wherein the support turner provides a ring-shape second rolling surface which has a C-shaped cross section and is symmetrically positioned with respect to the first rolling surface when the support turner is rotatably connected with the turner frame at the ring opening to enclose the rotor chamber of the turner frame; and a rotor mechanism comprising a plurality of ball-shape rotors each having a ball shape and a retainer unit configured to intervally retain the plurality of rotors in the rotor chamber in a rollable manner, such that when the rotor mechanism is received in the rotor chamber of the turner frame, each of the plurality of rotors is free to roll on both the first rolling surface of the turner frame and the second rolling surface of the support turner.

In one embodiment, the turner frame further comprises a mounting device extended inwardly from an inner wall thereof and configured for securely mounting the turner frame to a surface of an object.

In one embodiment, the retainer unit comprises a retainer ring which has a size and a width adapted to be received in the rotor chamber and is configured to spacedly and intervally retain the plurality of rotors in a rotatable manner, such that when the retainer ring is received in the rotor chamber of the turner frame, the plurality of rotors is free to roll on both the first rolling surface of the turner frame and the second rolling surface of the support turner.

In one embodiment, the retainer unit comprises a plurality of dividers configured to be received in the rotor chamber of the turner frame in such a manner that each of the plurality of rotors is placed between two of the plurality of dividers so as to spacedly and intervally retain the plurality of rotors rotatably in the rotor chamber such that the plurality of rotors is free to roll on both the first rolling surface of the turner frame and the second rolling surface of the support turner.

In one embodiment, the support turner has a U-shaped cross section and further comprises a ring-shape rolling rail having a C-shaped cross section disposed therein to provide the second rolling surface symmetrically paired with the first rolling surface of the turner frame for the plurality of rotors rolling on and between the first and second rolling surfaces.

Still further objects and advantages will become apparent from a consideration of the ensuing description and drawings.

These and other objectives, features, and advantages of the present invention will become apparent from the following detailed description, the accompanying drawings, and the appended claims.

The drawings, described above, are provided for purposes of illustration, and not of limitation, of the aspects and features of various examples of embodiments of the invention described herein. The drawings are not intended to limit the scope of the claimed invention in any aspect. For simplicity and clarity of illustration, elements shown in the drawings have not necessarily been drawn to scale and the dimensions of some of the elements may be exaggerated relative to other elements for clarity.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Further, this description is not to be considered as limiting the scope of the embodiments described herein in any way, but rather as merely describing implementation of the one or more embodiments described herein.

Referring to FIG. 1 to FIG. 7, a turner apparatus according to a preferred embodiment of the present invention is illustrated, wherein the turner apparatus is configured for being supportively disposed between two surfaces of two objects so as to allow the two objects rotating with respect to each other. The turner apparatus comprises a hollow frame body 10 and a rotor mechanism 20 rotatably retained within the frame body 10. The frame body 10 comprises a turner frame 11 and a support turner 12. The rotor mechanism 20 comprises a plurality of ball-shape rotors 21 and a retainer unit 22.

Figure 4:
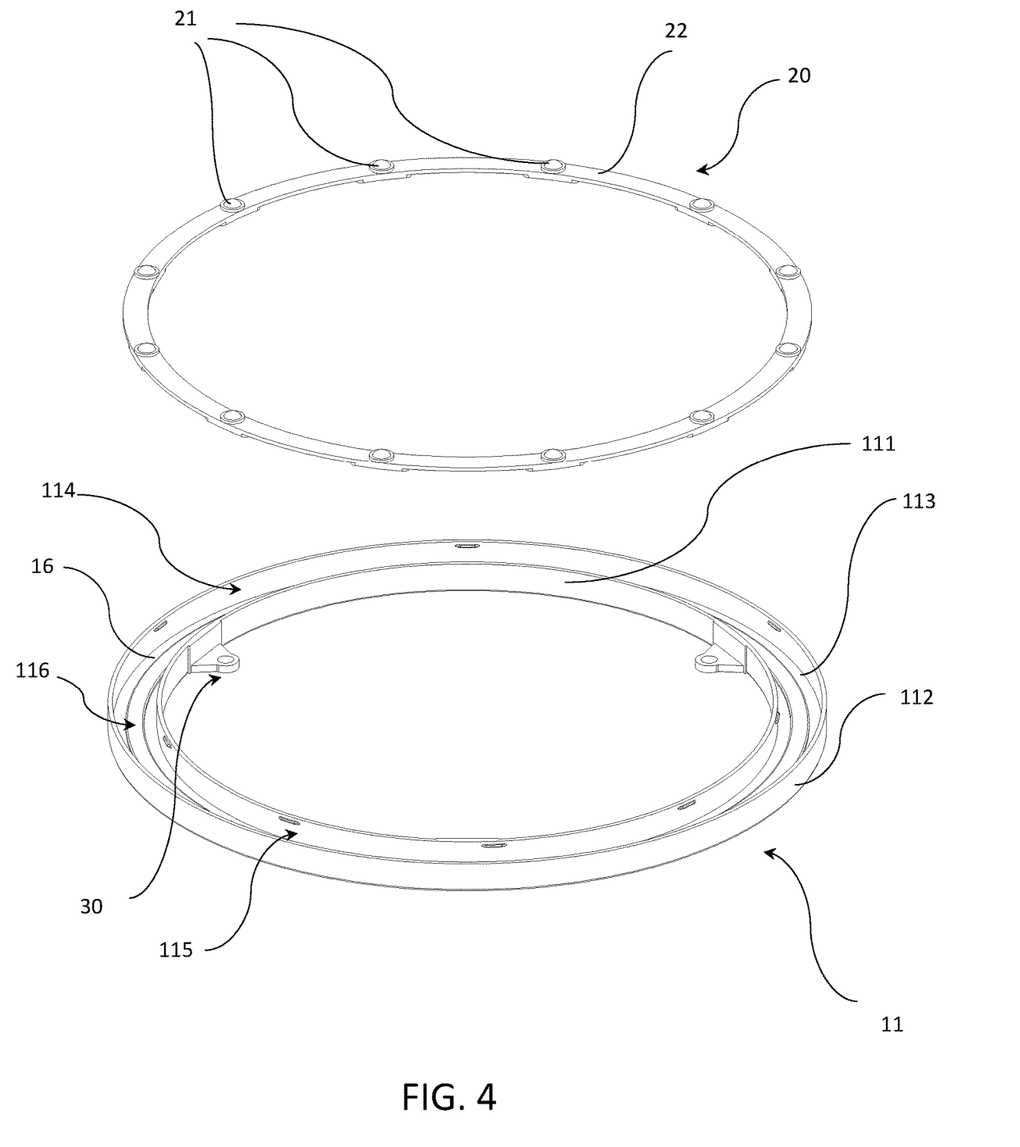
FIG. 4 is an enlarged perspective view of the turner frame and the rotor mechanism of the turner apparatus according to the above preferred embodiment of the present invention.
Figure 6:
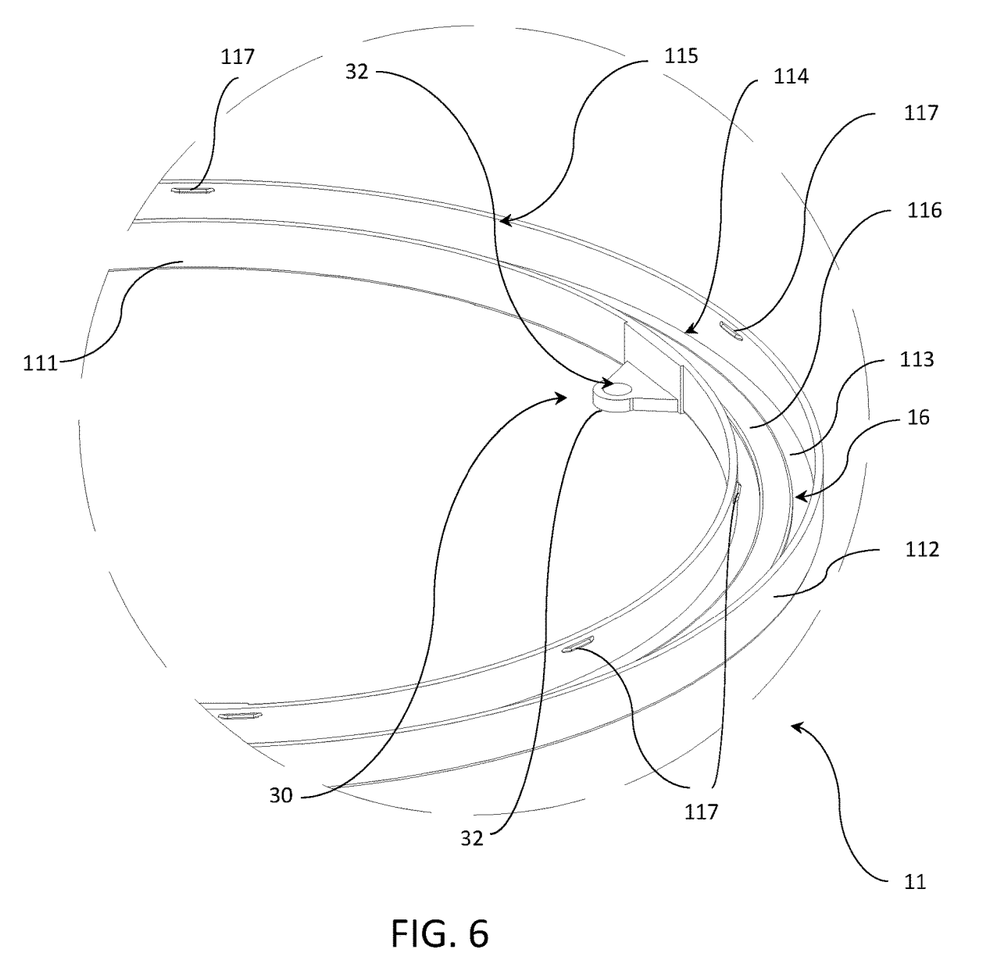
FIG. 6 is a partial enlarged perspective view of the turner frame of the turner apparatus according to the above perspective embodiment of the present invention.

Referring to FIG. 4 and FIG. 6, the turner frame 11 has a ring shape and a U-shaped cross section, wherein a circular inner wall 111, a circular outer wall 112 and a ring-shaped bottom wall 113 integrally extended between the inner wall 111 and the outer wall 112 to define a circular rotor chamber 114 inside the turner frame 11 and a ring opening 115 communicating to outside. The turner frame 11 further has a ring-shape concave first rolling surface 116 having a C-shaped cross section. The first rolling surface 116 is coaxially formed on the bottom wall 113 within the rotor chamber 114 and facing toward the ring opening 115.

According to the preferred embodiment, the curvature of the concave first rolling surface 116 is formed corresponding to the curvature of each of the plurality of rotors 21 so as to allow the plurality of rotors being retained and rolling thereon.

When the turner frame 11 is made of plastic or metal by molding, the first rolling surface 116 is preferred to be integrally molded on the bottom wall 113. Alternatively, the turner frame 11 may further comprises a C-shaped rolling rail 16 having the concave first rolling surface 116 provided thereon, wherein the rolling rail 16 can be integrally glued to the bottom wall 113 of a plastic made turner frame 11 or welded to the bottom wall 113 of a metal made turner frame 11. A width of the rolling surface 116 or a width of the rolling rail 16 is preferred to be smaller than a width of the rotor chamber 114. It is worth mentioning that other fastening means such as screwing is capable of securely affixing the rolling rail 16 to the bottom wall 113 of the turner frame 11 no matter the material thereof. It is appreciated that the turner frame 11 and the rolling rail 16 can be made of different materials. For example, the turner frame 11 can be molded with plastic material to form a circular concave slot in the bottom wall 113 and the rolling rail 16 which has the C-shaped cross section can be made of metal by stamping such as stainless steel or tempered steel with the first rolling surface 116 that is smooth, anti-friction and wear-resistance, wherein the metal made rolling rail 16 can be fittingly embedded in the concave slot in the bottom wall 113 of the turner frame 11 so as to not only provide the smooth, anti-friction and wear-resistance properties for the plurality of rotors 21 smoothly rolling thereon, but also configure as supportive skeleton to reinforce the plastic made turner frame 11. The rolling rail 16 can also be made of ceramics for excellent smoothness and hardness while the turner frame can also be made of hard and rigid material such as stainless steel, tempered steel or the like.

Figure 5:
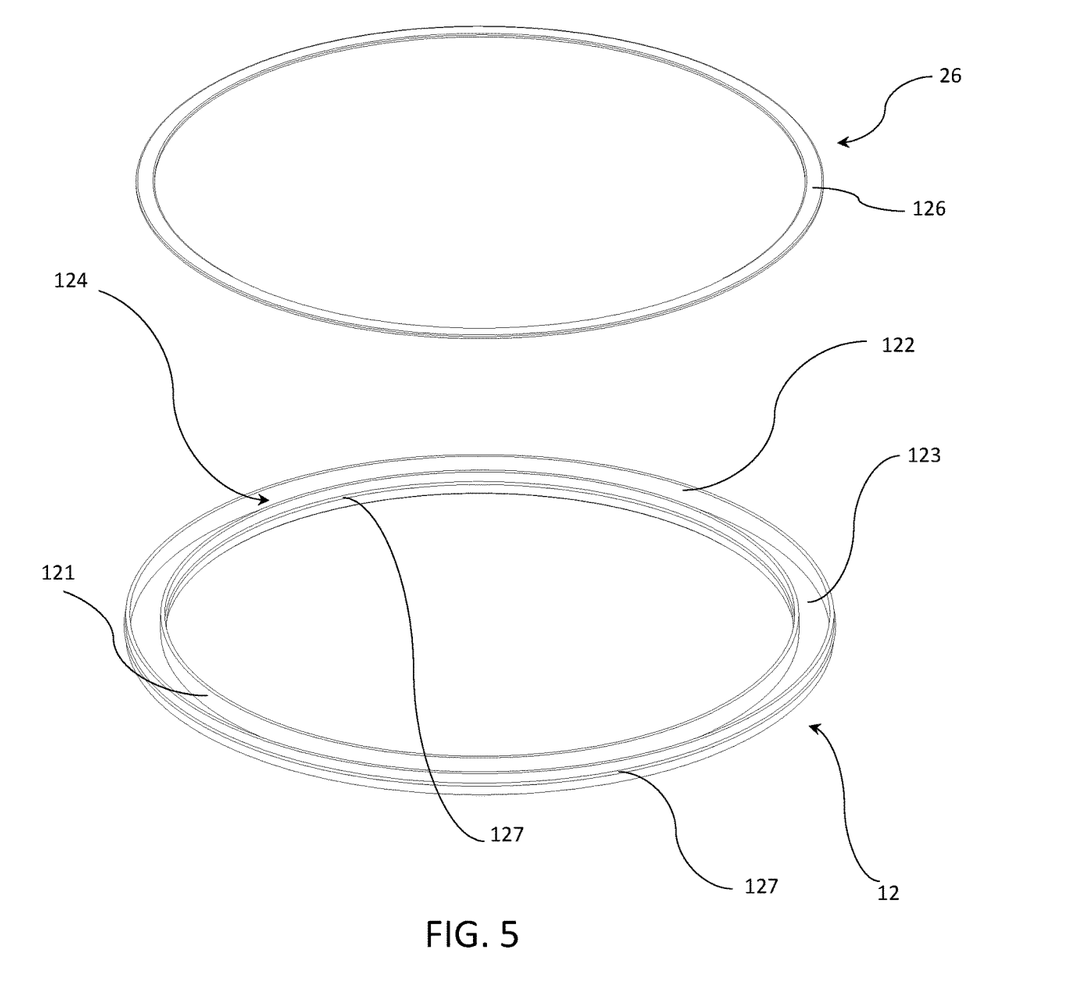
FIG. 5 is an enlarged perspective view of the support turner and the rotor mechanism of the turner apparatus according to the above preferred embodiment of the present invention.

Referring to FIG. 5, the support turner 12 has a ring shape configured to be fittingly and rotatably mounted at the ring opening 115 of the turner frame 11 to form the frame body 10, wherein the support turner 12 provides a ring-shape second rolling surface 126 which has a C-shaped cross section and is symmetrically positioned with respect to the first rolling surface 116 when the support turner 12 is rotatably connected with the turner frame 11 at the ring opening 115 to enclose the rotor chamber 114 of the turner frame 11.

Figure 2:
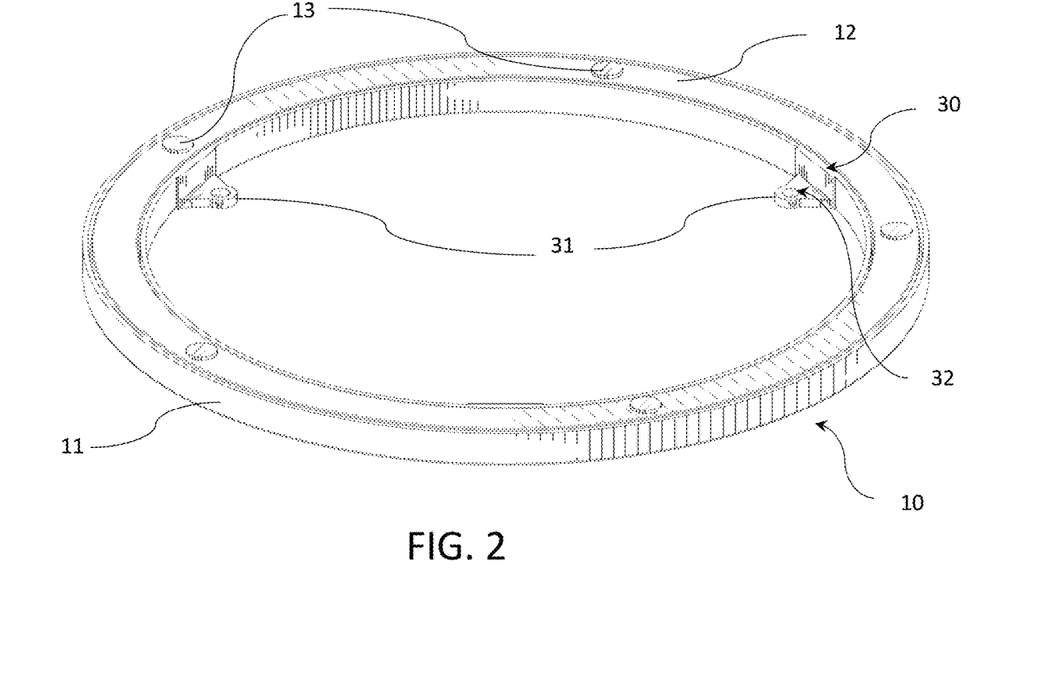
FIG. 2 is another perspective view of the turner apparatus according to the above preferred embodiment of the present invention.
Figure 3:
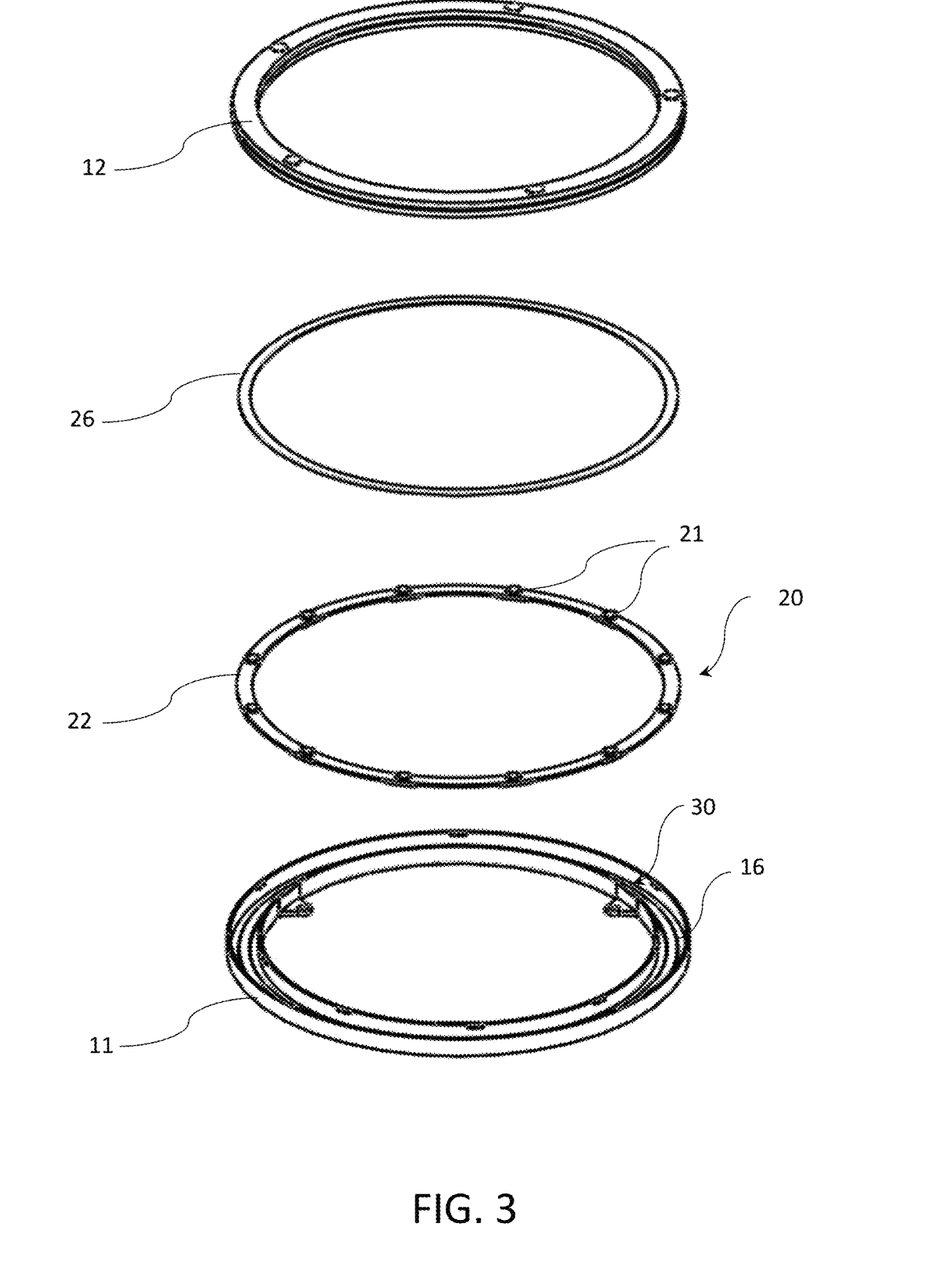
FIG. 3 is an exploded perspective view of the turner apparatus according to the above preferred embodiment of the present invention.

According to the preferred embodiment, referring to FIGS. 2, 3 and 5, the support turner 12, which is embodied to have a U-shaped cross section, has a circular inner rib 121, a circular outer rib 122 and a ring-shaped support wall 123 integrally extended between the inner rib 121 and the outer rib 122 to define a circular receiving chamber 124. A width of the support turner 12 is preferred to be slightly smaller than that of the rotor chamber 114 and the ring opening 115, and a height of each of the inner and outer ribs 121, 122 of the support turner 12 is preferred to be shorter than that of the inner and outer walls 111, 112 of the turner frame 11, so that the support turner 12 is able to rotatably connect with turner frame 11 by inserting the inner rib 121 and the outer rib 122 thereof into the rotor chamber 114 and positioning adjacent to the inner wall 111 and the outer wall 112 of the turner frame 11 respectively so as to reinforce the inner and outer walls 111, 112 while the support wall 123 rotatably covers the ring opening 115 to enclose the rotor chamber 114 and the second rolling surface 126 faces the first rolling surface 116 coaxially and is symmetrically positioned with respect to the first rolling surface 116.

According to the preferred embodiment, referring to FIG. 3 to FIG. 5, the second rolling surface 126 has a C-shaped cross section and the same curvature of the first rolling surface 116, such that when the rotor mechanism 20 is received in the rotor chamber 114, and enclosed by the support turner 12, the first rolling surface 116 and the second rolling surface 126 are coaxially positioned in a face to face manner to combine and form a ring-shaped rolling slot to retain the plurality of rotors 21 therein in a rotatable manner. According to the preferred embodiment, each of the plurality of rotors 21 of the rotor mechanism 20 has a ball shape and the retainer unit 22 is configured to intervally and spacedly retain the plurality of rotors in the rotor chamber 114 in a rollable manner such that each of the plurality of rotors is free to roll on both the first rolling surface 116 of the turner frame 11 and the second rolling surface 126 of the support turner 12.

Similarly, like the first rolling surface 116, the second rolling surface 126 can also be integrally provided on the support wall 123. When the support turner 12 is made of plastic, the second rolling surface 126 can be molded to form on the support wall 123. Alternatively, the second rolling surface 126 can be a concave surface of a second rolling rail 26 adhered or fastened to the support wall 123 of the support turner 12. It is worth mentioning that, like the turner frame 11, the second rolling rail 26 and the support turner 12 can be made of the same material or different materials. It is appreciated that the symmetrical arrangement of the first rolling surface 116 and the second rolling surface 126 provide a rolling track channel for the plurality of rotors 21 ensuring each of the rotors 21 regularly and smoothly rolling along the rolling track channel and avoiding any rotor 21 rolling out of the track, that significantly allows the turner frame 11 and the support turner 12 to revolve relatively with respect to each other smoothly while being able to support a predetermined weight in the axial direction of the turner apparatus.

Figure 1:
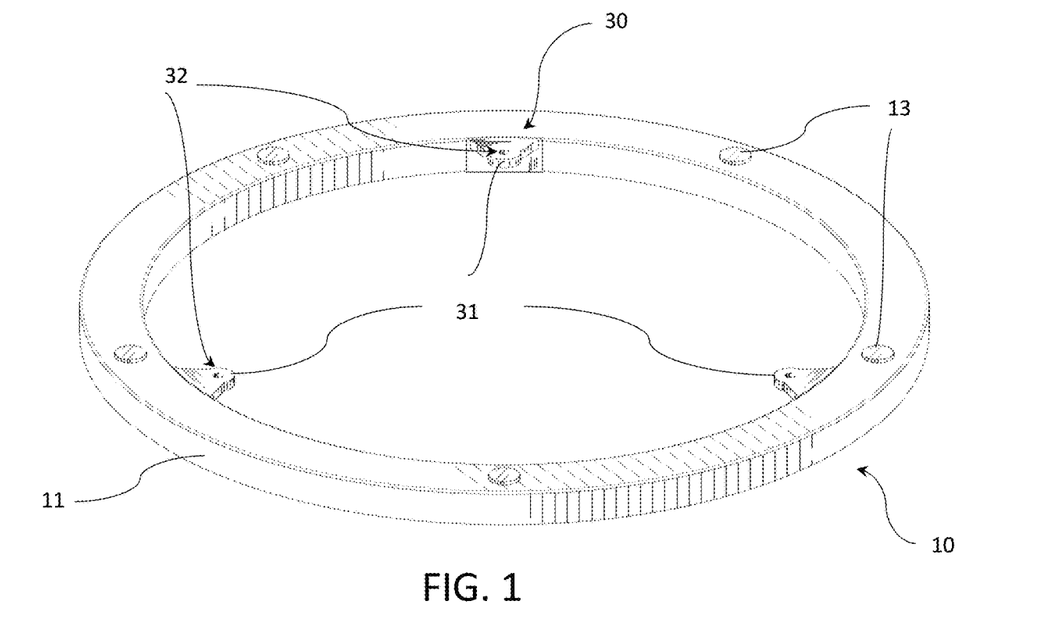
FIG. 1 is a perspective view of a turner apparatus according to a preferred embodiment of the present invention.

According to the preferred embodiment, the second rolling rail 26 and the support turner 12 are independently provided for ease of assembly and alignment with the first rolling surface 116 and the rotor mechanism 20. Referring to FIG. 3, to assemble the turner apparatus of the present invention, the rotor mechanism 20 is disposed in the rotor chamber 114 and rotatably sit on the rolling rail 16 while the plurality of rotors 21 is free to roll on the first rolling surface 116. Then, the second rolling rail 26 can be placed on the rotor mechanism 20 easily while ensuring the second rolling surface 126 coaxially and symmetrically to be positioned with respect to the first rolling surface 116 and the rotor mechanism 20 can be rotated between the first and second rolling surfaces 116, 126 smoothly. Finally, enclose the rotor chamber 114 by rotatably connecting the support turner 12 with the turner frame 11, simply by inserting the inner rib 121 and the outer rib 122 in the rotor chamber 114 of the turner frame 11 until the support wall 123 rotatably retaining at the ring opening 115 to cover the ring opening 115 and enclose the rotor chamber 114 so as to form the turner apparatus as shown in FIG. 1 and FIG. 2.

Figure 7A:
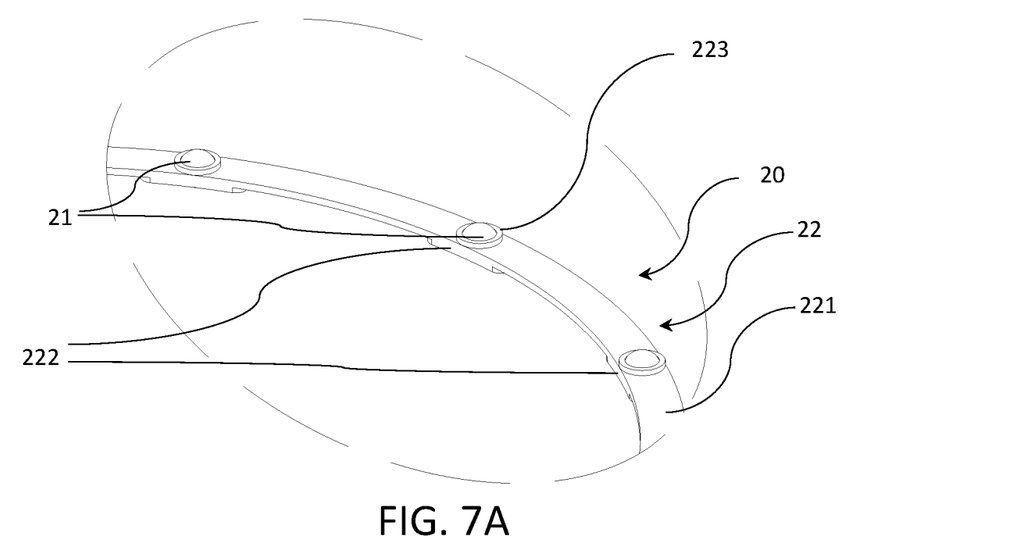
FIG. 7A is a partial perspective view of the rotor mechanism of the turner frame of the turner apparatus according to the above perspective embodiment of the present invention.
Figure 7B:
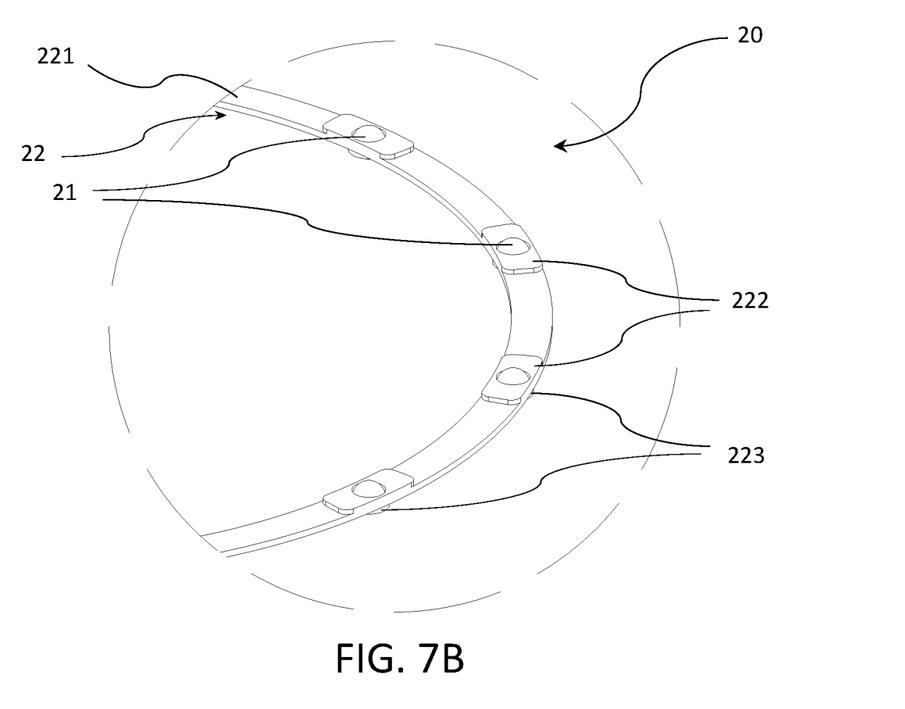
FIG. 7B is another partial enlarged perspective view of the turner frame of the turner apparatus according to the above perspective embodiment of the present invention.

Referring to FIG. 7A and FIG. 7B, according to the preferred embodiment, the retainer unit 22 of the rotor mechanism 20 is embodied to comprises a retainer ring 221 having a diameter generally equal to the circular first and second rolling surfaces 116, 126, a plurality of retaining base 222 integrally protruded on one side of the retainer ring 221 and a plurality of retainer concave retaining holes for the plurality of rotors 21 being rotatably retained therein respectively. The retainer unit 22 further comprises a plurality of locking members 223, each having a rotor hole, integrally affixed coaxially with the retaining holes on another side of the retainer ring 221 so as to lock the plurality of rotors 21 in position respectively while allowing the plurality of rotors 21 in a free rolling manner.

As described above, the height of the inner rib 121 and the outer rib 122 of the support turner 12 are preferred to match with a depth of the rotor chamber 114 of the turner frame 11 so as to support the support wall 123 of the support turner 12 at the ring opening 115 of the turner frame 11, wherein the rotor mechanism 20 has an overall height slightly smaller than the depth of the rotor chamber 114 such that the rotor mechanism 20 and the support turner 12, as well as the rolling rails 16, 26, fill in rotor chamber 114 of the turner frame 11 that substantially supports the turner frame 11 to form a rigid body ensuring the turner apparatus being strong enough to support a predetermined weight. It is worth mentioning that an overall thickness of the support turner 12 is preferred to be higher than a depth of the rotor chamber 114 of the turner frame 12. In order to securely retain the support turner 12 in the rotor chamber 114 in the rotatable manner while it is easy and fast to be assembled and disassembled, as shown in FIG. 5 and FIG. 6, the turner frame 11 further has a plurality of locker lips 117 inwardly protruded at upper portions of inner sides of the inner wall 111 and outer wall 112 of the turner frame 11 spacedly and intervally and the support turner 12 has a circular retainer lip 127 outwardly protruded at a mid-portion of each of the outer sides of the inner rib 121 and the outer rib 122 of the support turner 12 respectively, such that the support turner 12 is able to be inserted in the rotor chamber 114 until the retainer lips 127 snapped below the locker lips 117 of the turner frame 11, referring to FIG. 8 and FIG. 9, so that the locker lips 117 can retain and lock the support turner 12 in the rotor chamber 114 in a rotatable manner with respect to the turner frame 11 unless manually pulling the support turner 12 out from the rotor chamber 114 until the retaining lips 117 being outwardly detached out of the locker lips 117 in order to disassemble the turner apparatus.

Figure 8:
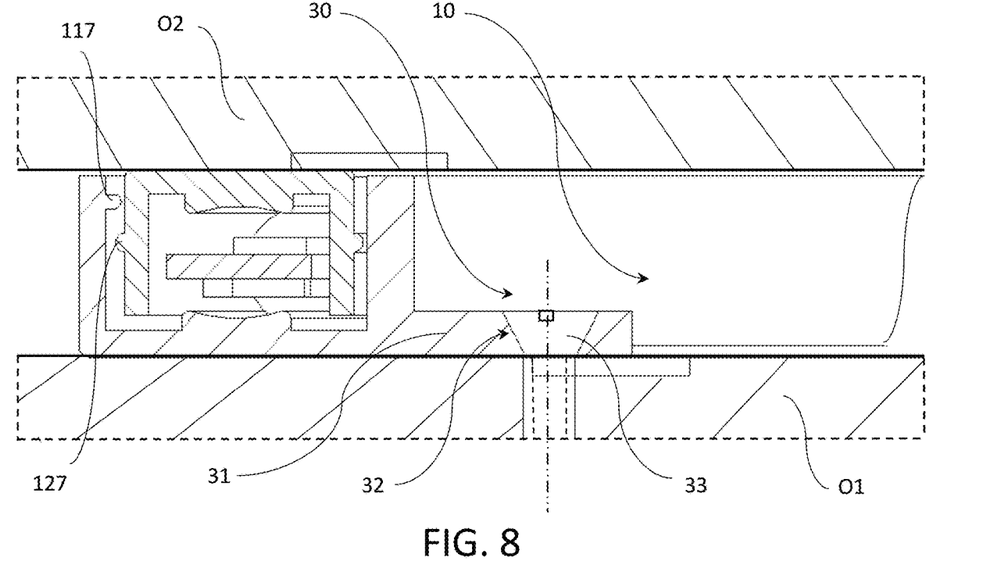
FIG. 8 is a partial sectional view illustrating the turner apparatus placed between two objects according to the above preferred embodiment of the present invention.

It is appreciated that the turner apparatus of the present invention is a standard product that can be applied to various configurations for allowing relative rotation between two surfaces of two objects. As shown in FIG. 8, the turner apparatus 10 is good for merely placed between a first surface pf a first object O1 and a second surface of a second object O2. To increase friction between the turner apparatus and the contacting surfaces of the first and the second objects O1, O2, an outer side of the bottom wall 113 of the turner frame 11 and an outer side of the support bottom 123 of the support turner 12 provide a plurality of friction pads 13 intervally affixed thereon so that when the outer sides of the bottom wall 113 of the turner frame 11 and the support bottom 123 of the support turner 12 are in contact with the contacting surfaces of the first and second objects O1, O2 respectively, the friction pads 13 enhance relative friction therebetween and thus the weight of the upper object O1 or O2 substantially pressing down to ensure rotation of the upper object O1 or O2 rotating with respect to the lower object O1 or O2. For example, the first object O1 is a table and the second object O2 can be a game board, an electrical appliance such as microwave, a dish platform, or etc. with the turner apparatus of the present invention placed therebetween, and thus the weight of the second object O2 presses against either the turner frame 11 or support turner 12 (depending on whether the turner apparatus is sat on the first object O1 with the turner frame 11 on top or the support turner 12 on top) and ensures the position of the turner apparatus, so that the second object O2 is in rotatable state and is able to revolve along the axis of the turner apparatus with respect to the first object O1 in stationary state.

In order to further ensure a position of the turner apparatus with one of the objects O1, O2 (for example the first object O1), the turner apparatus of the present invention is preferred to further comprises a mounting device 30 for securely mounting the turner frame to a surface of an object.

According to the preferred embodiment, referring to FIG. 1 and FIG. 2, the mounting device 30 comprises a plurality of fixing elements 31 intervally extended from an inner side of the inner wall 111 of the turner frame 11. The plurality of fixing element 31 can be fastened to the inner wall 111 of the turner frame 11. Preferably, the plurality of fixing elements 31 is integrally formed and extended from a bottom edge of the inner wall 111 of the turner frame 11 as shown in FIG. 1, FIG. 2 and FIG. 8, wherein each of the plurality fixing element 31 has a countersunk hole 32 therethrough for a screw 33 to fasten to the first object O1 as shown in FIG. 8. Therefore, the second object O2 supported on the support turner 12 can be revolving with the support turner 12 with respect to the stationary turner frame 11 and the first object O1 about the axis of the turner apparatus. In addition, the distance between the first and second surfaces of the first and second objects O1, O2 is merely the thickness of the turner apparatus.

Figure 9:
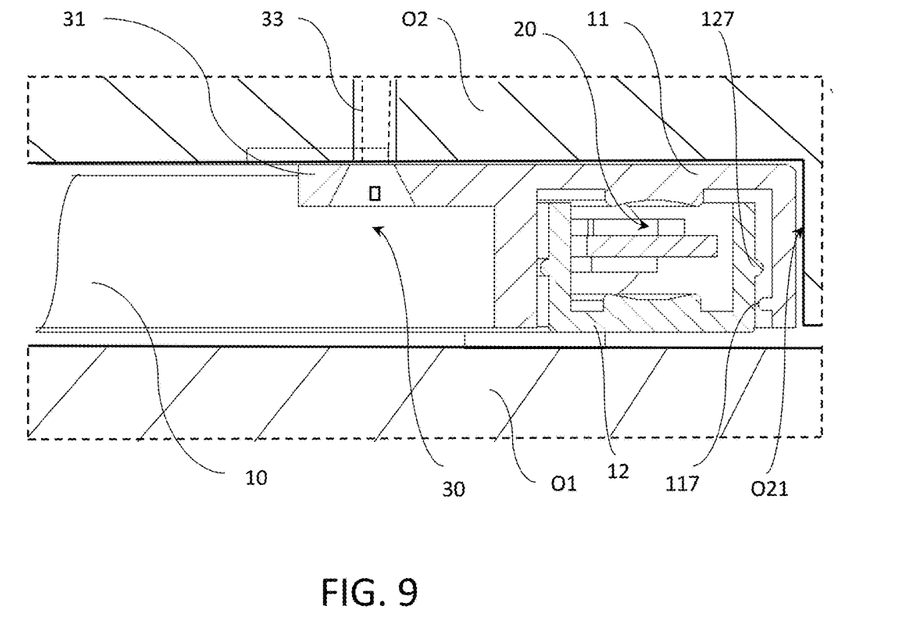
FIG. 9 is a partial sectional view illustrating the turner apparatus embedded between two objects according to the above preferred embodiment of the present invention.

In order to further reduce the distance between the first and second surfaces of the first and second objects O1, O2, one of the first and second objects O1, O2, depending which object is the turner frame 11 connecting thereto, forms a recess to receive the turner frame 11 therein. For example, if the turner apparatus of the present invention is arranged to permanently install to an object such as a game platform, dish platform or a microwave, as shown in FIG. 9, the second object O2 has a circular recess O21 in the contacting surface thereof and a depth slightly smaller than a thickness of the turner frame 11, so as to allow the turner frame 11 being embedded therein and fastened by the screws 33 through the fixing elements 31 of the mounting device 30. Therefore, the second object O2 can be disposed on any surface of any object with the revolving function provided by the turner apparatus embedded thereunder.

Figure 10:
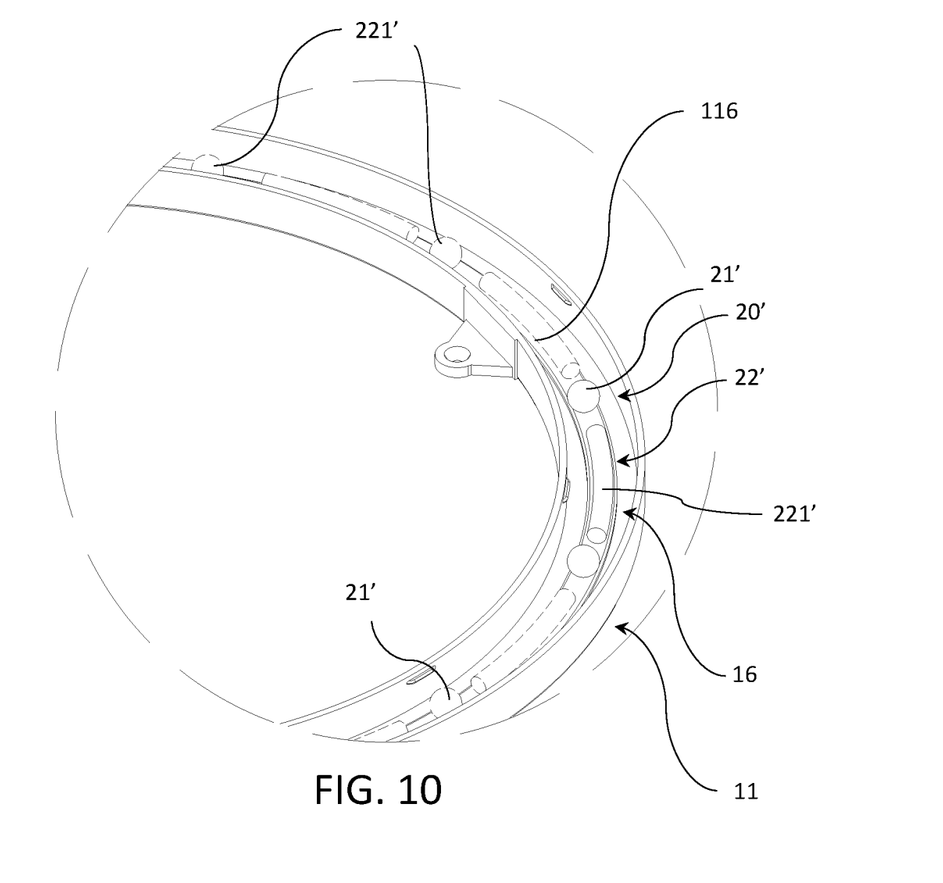
FIG. 10 is a partial perspective view illustrating an alternative mode of the rotor mechanism incorporated with the turner frame of the turner apparatus according to the above preferred embodiment of the present invention.

Referring to FIG. 10, an alternative mode of the rotor mechanism according to the preferred embodiment of the present invention, wherein the rotor mechanism comprises a plurality of rotors 21' each having a ball shape and a retainer unit 22' which comprises a plurality of dividers 221' each having an elongated cylinder shape and a diameter smaller than the rotor 21'. The plurality of rotors 21' is spacedly arranged in the rolling track channel defined between the first rolling surface 116 and the second rolling surface 126 and each of the plurality of dividers 221' is intervally disposed between two of the plurality of rotors 21' within the rolling track channel defined between the first and second rolling surfaces 116, 126, such that the plurality of dividers 221' is able to divide the plurality of rotors 21' spacedly and intervally to ensure each of the plurality of rotors 21' is free to rolling along the rolling track channel between the first and second rolling surfaces 116, 126 of the turner frame 11 and the support turner 12. To assembly, the plurality of rotors 21' and the plurality of dividers 221' of the retainer unit 21' are aligned and disposed on the first rolling surface 116 of the turner frame 11, and then cover the first rolling surface 116 with the second rolling surface 126 to enclose the plurality of rotors 21' and the plurality of dividers 221' therebetween as well as enclosing the rotor chamber 114 by the support turner 12.

Figure 11:
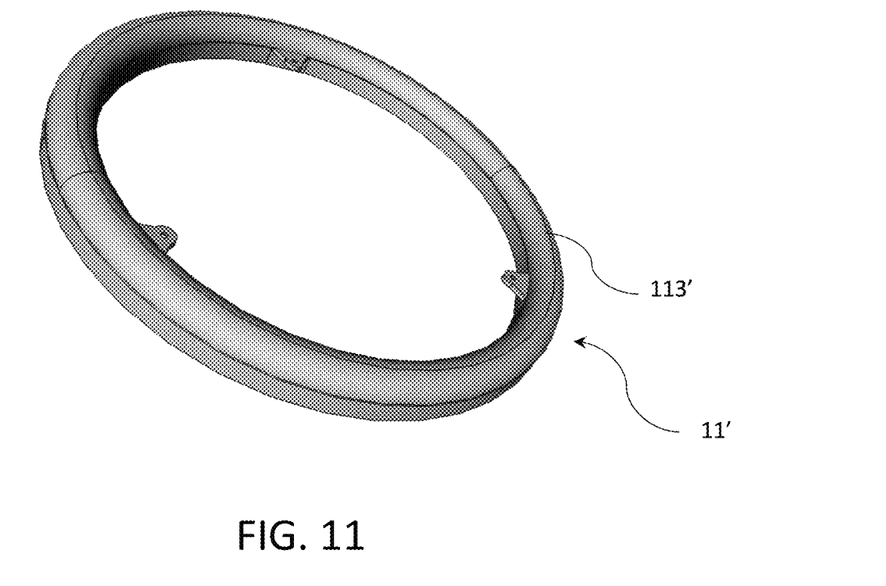
FIG. 11 is a perspective view of an alternative mode of the turner apparatus of the preferred embodiment of the present invention.
Figure 12:
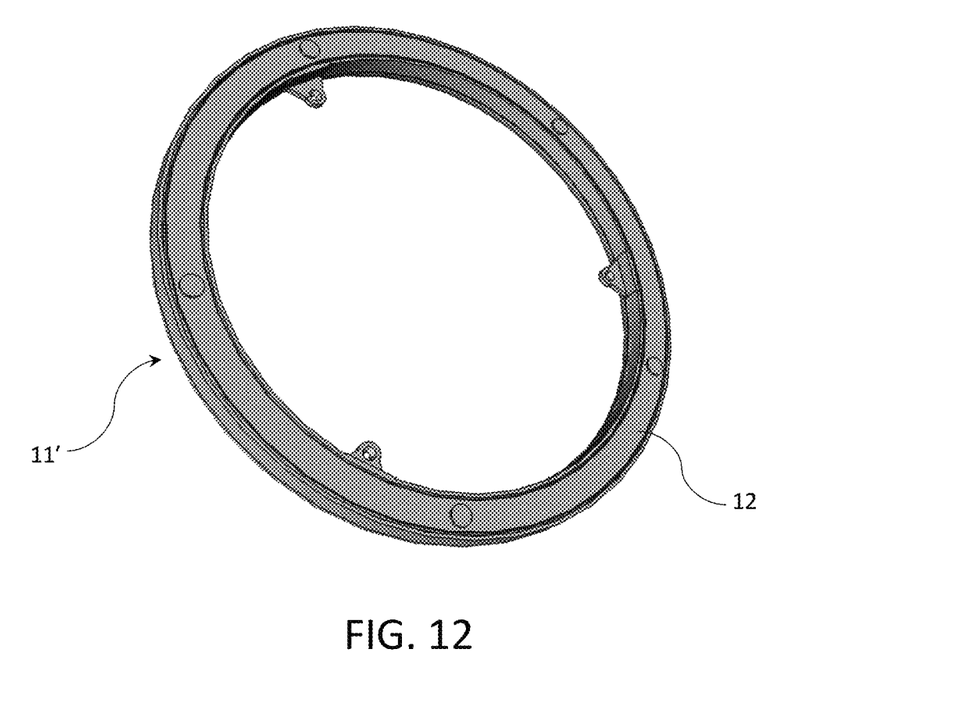
FIG. 12 is another perspective of the alternative mode of the turner apparatus of the preferred embodiment of the present invention.

Referring to FIG. 11 and FIG. 12, an alternative mode of the turner frame 11' of the turner apparatus according to the present invention is illustrated, which has the same configuration as the turner frame 11 of the preferred embodiment described above, except the bottom wall 113' of the turner frame 11 is made to have a C-shape so that the inner side of the bottom wall 113' is also in C-shape and has a curvature to function as the first rolling surface 116 to allow the rotor mechanism 20 directly rotatably disposed thereon. Person skill in the art may be inspired by the disclosure of the present invention to have various modifications and alternatives based on the inventive concept of the present invention. Therefore, one skilled in the art will understand that the embodiment of the present invention as shown in the drawings and described above is exemplary only and not intended to be limiting.

In view of above, the turner apparatus of present invention has as less component as possible while providing relative strong and durable structure which can be equipped in various industrial products to allow relative rotation between two surfaces of two objects. Also, the turner apparatus has a relatively thin thickness for ease of mounting between two parallel surfaces ensuring one of the surfaces to turn about the other surface along an axis of the turner apparatus.

In addition, in one embodiment, the turner apparatus, having a ring shape, is adapted to be embedded in a ring-shaped recess indented in a first surface of a first object. It may also comprise a mounting device configured to easily mount the turner apparatus on the first surface of the first object in such a manner that a second surface of a second object can sit on the first surface of the first object while minimizing a gap between the first and second surfaces and allowing the second object to be rotating on the first surface of the first object or the first object to be rotating on the second surface of the second object. Alternatively, the second surface of the second object may have the ring-shaped receiving recess shaped and sized to fittingly receive the turner apparatus therein such that the first surface of the first object and the second surface of the second object are able to be rotated with respect to each other that also not only minimizes a gap between the first and second surfaces but also relatively lock and secure the turner apparatus in position in radial direction with the second object.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A turner apparatus, for being supportively disposed between two surfaces of two objects for allowing said two objects rotating with respect to each other, comprising:
   a frame body which comprises:
   a ring-shape turner frame having a ring-shape rotor chamber formed therein, a ring opening and a ring-shape first rolling surface having a C-shaped cross section; and
   a ring-shape support turner configured to be fittingly and rotatably mounted at said ring opening of said turner frame to form said frame body while said turner frame is able to coaxially rotate with respect to said support turner, wherein said support turner provides a ring-shape second rolling surface which has a C-shaped cross section and is symmetrically positioned with respect to said first rolling surface when said support turner is rotatably connected with said turner frame at said ring opening to enclose said rotor chamber of said turner frame; and
   a rotor mechanism comprising a plurality of rotors each having a ball shape and a retainer unit configured to intervally retain said plurality of rotors in said rotor chamber in a rollable manner, such that when said rotor mechanism is received in said rotor chamber of said turner frame, each of said plurality of rotors is free to roll on both said first rolling surface of said turner frame and said second rolling surface of said support turner;
   wherein said support turner has a U-shaped cross section and further comprises a ring-shape rolling rail having a C-shaped cross section disposed therein to provide said second rolling surface symmetrically pair with said first rolling surface of said turner frame for said plurality of rotors rolling on and between said first rolling surface and said second rolling surface.

2. The turner apparatus, as recited in claim 1, further comprising a mounting device extended from said turner frame for securely mounting said turner frame to said surface of one of said two objects.

3. The turner apparatus, as recited in claim 2, wherein said mounting device comprises a plurality of fixing elements intervally extended from an inner side of an inner wall of said turner frame, wherein each of said plurality of fixing elements has a hole for screwing to one of said two objects.

4. The turner apparatus, as recited in claim 1, wherein said first rolling surface and said second rolling surface form a ring-shape rolling track channel therebetween and said plurality of rotors is able to be intervally revolving along said rolling track channel.

5. The turner apparatus, as recited in claim 1, wherein said retainer unit comprises a retainer ring having a size and a width adapted to be received in said rotor chamber and is configured to spacedly and intervally retain said plurality of rotors in a rotatable manner, such that when said retainer ring is received in said rotor chamber of said turner frame, said plurality of rotors is free to roll on both said first rolling surface of said turner frame and said second rolling surface of said support turner.

6. The turner apparatus, as recited in claim 1, wherein said retainer unit comprises a plurality of dividers configured to be received in said rotor chamber of said turner frame in such a manner that each of said plurality of rotors is placed between two of said plurality of dividers so as to spacedly and intervally retain said plurality of rotors rotatably in said rotor chamber such that said plurality of rotors is free to roll on both said first rolling surface of said turner frame and said second rolling surface of said support turner.

7. The turner apparatus, as recited in claim 1, wherein said turner frame has a plurality of locker lips inwardly protruded at upper portions of inner sides of an inner wall and an outer wall of the turner frame spacedly and intervally and said support turner has a circular retainer lip outwardly protruded at a mid-portion of each of outer sides of an inner rib and an outer rib of said support turner respectively, such that said support turner is able to be inserted in said rotor chamber until said retainer lips snapped below said locker lips of said turner frame, so that said locker lips are able to retain and lock said support turner in said rotor chamber in a rotatable manner with respect to said turner frame.

8. A turner apparatus comprising:
a frame body which comprises:
  a first moving member comprising a substantially ring-shape first rolling surface having a substantially C-shaped cross section; and
  a second moving member comprising a substantially U-shaped cross section and further comprises a substantially ring-shape second rolling surface having a substantially C-shaped cross section;
a plurality of rotors rotatably retained between said first moving member and said second moving member;
wherein said first moving member is rotatably mounted to said second moving member by said rotors;
wherein the first rolling surface is symmetrically positioned with respect to said second rolling surface; and
wherein the turner apparatus further comprises a retainer unit configured to intervally retain said plurality of rotors in a rollable manner, thereby each of said plurality of rotors is free to roll on both said first rolling surface of the first moving member and said second rolling surface of said second moving member;
wherein the retainer unit comprises a retainer ring, a plurality of retaining holes for the plurality of rotors being rotatably retained therein respectively, and a plurality of locking members, each of the locking members comprises a rotor hole integrally affixed coaxially with the retaining holes on one side of the retainer ring so as to lock the plurality of rotors in position respectively while allowing the plurality of rotors in a free rolling manner.

9. The turner apparatus, as recited in claim 8, wherein the retainer ring has a diameter generally equal to the circular first and second rolling surfaces.

10. The turner apparatus, as recited in claim 9, wherein retainer unit further comprises a plurality of retaining base integrally protruded on another side of the retainer ring.

11. The turner apparatus, as recited in claim 8, wherein said first moving member has a locker lip protruded at a side wall of the first moving member and said second moving member has a retainer lip protruded at a rib of said second moving member, such that said retainer lip is snapped with said locker lip of said first moving member, so that said locker lip is able to retain and lock said second moving member in a rotatable manner with respect to said first moving member.

12. A turner apparatus comprising:
a frame body which comprises:
  a first moving member comprising a first wall, a bottom wall extending from the first wall, a rotor chamber formed by the first wall together with the bottom wall, and a locker lip protruded at said first wall of the first moving member towards the rotor chamber; and
  a second moving member comprising a first rib received in the rotor chamber, a retainer lip protruded at the first rib of said second moving member towards the first wall;
a plurality of rotors rotatably retained between said first moving member and said second moving member;
wherein said retainer lip is snapped with said locker lip of said first moving member, so that said locker lip is able to retain and lock said second moving member in a rotatable manner with respect to said first moving member; and
wherein the locker lip has a plurality of parts spacedly and intervally extending from the first wall.

13. The turner apparatus, as recited in claim 12, wherein said retainer lip is circular.

14. The turner apparatus, as recited in claim 13, wherein the locker lip is protruded at upper portions of the first wall.

15. The turner apparatus, as recited in claim 12, wherein the first moving member further comprises a second wall opposite to the first wall for forming the rotor chamber cooperated with the first wall and the bottom wall.

16. The turner apparatus, as recited in claim 12, wherein the second moving member has a U-shaped cross section and further comprises a second rib opposite to the first rib.

\* \* \* \* \*